(12) United States Patent
Hislop

(10) Patent No.: US 10,077,944 B2
(45) Date of Patent: Sep. 18, 2018

(54) COMBINED CHAMBER WALL AND HEAT EXCHANGER

(75) Inventor: Drummond Watson Hislop, London (GB)

(73) Assignee: HIETA TECHNOLOGIES LIMITED, Wokingham (GB)

( * ) Notice: Subject to any disclaimer, the term of this patent is extended or adjusted under 35 U.S.C. 154(b) by 1098 days.

(21) Appl. No.: 13/885,299

(22) PCT Filed: Nov. 11, 2011

(86) PCT No.: PCT/GB2011/052200
§ 371 (c)(1),
(2), (4) Date: May 14, 2013

(87) PCT Pub. No.: WO2012/066311
PCT Pub. Date: May 24, 2012

(65) Prior Publication Data
US 2013/0233526 A1    Sep. 12, 2013

(30) Foreign Application Priority Data

Nov. 15, 2010  (GB) .................................. 1019287.0

(51) Int. Cl.
*B23K 1/005*     (2006.01)
*B21D 53/04*     (2006.01)
(Continued)

(52) U.S. Cl.
CPC .............. *F28D 1/06* (2013.01); *B21D 53/02* (2013.01); *B22F 3/1055* (2013.01); *B22F 7/004* (2013.01);
(Continued)

(58) Field of Classification Search
CPC ........ F02G 1/055; B22F 7/004; B22F 3/1055; F28F 7/02; Y10T 29/4932; Y10T 29/49364; Y10T 29/49393
(Continued)

(56) References Cited

U.S. PATENT DOCUMENTS 2,481,236 A * 9/1949 Patterson ................ F28D 1/024
                                              165/125
2,682,365 A * 6/1954 Pielstick ............. F04D 29/5826
                                              415/178
(Continued)

FOREIGN PATENT DOCUMENTS

CN      2851601       12/2006
CN    101080300       11/2007
(Continued)

OTHER PUBLICATIONS

WO 99/61858 A1 to Mark Henry.*
(Continued)

*Primary Examiner* — Mark Laurenzi
*Assistant Examiner* — Anthony Ayala Delgado
(74) *Attorney, Agent, or Firm* — Nixon & Vanderhye P.C.

(57) ABSTRACT

An apparatus having a wall configured to serve as at least part of a chamber for containing a charge fluid is provided. The wall includes a heat exchanger portion integrally formed with the wall. The heat exchanger portion includes an array of conduits passing therethrough and providing fluid communication with outside of the heat exchange portion. The heat exchange portion is configured to contribute strength to the wall to provide containment of the charge fluid.

2 Claims, 12 Drawing Sheets

(51) Int. Cl.
  *F28D 1/06* (2006.01)
  *B22F 3/105* (2006.01)
  *B22F 7/00* (2006.01)
  *F02G 1/055* (2006.01)
  *F28F 7/02* (2006.01)
  *B21D 53/02* (2006.01)
  *B33Y 80/00* (2015.01)

(52) U.S. Cl.
  CPC ............... *F02G 1/055* (2013.01); *F28F 7/02* (2013.01); *B22F 2003/1056* (2013.01); *B33Y 80/00* (2014.12); *F02G 2256/04* (2013.01); *Y02P 10/295* (2015.11); *Y10T 29/49364* (2015.01)

(58) Field of Classification Search
  USPC .......................................................... 418/83
  See application file for complete search history.

(56) References Cited

U.S. PATENT DOCUMENTS

| | | | | |
|---|---|---|---|---|
| 3,986,799 | A * | 10/1976 | McCullough | F01C 1/0215 418/151 |
| 4,125,345 | A * | 11/1978 | Yoshinaga | F04D 17/12 415/179 |
| 7,325,399 | B2 * | 2/2008 | Strimling | F02G 1/055 60/520 |
| 8,978,381 | B2 * | 3/2015 | Hirshberg | F25B 9/00 60/650 |
| 2008/0210413 | A1 * | 9/2008 | Hislop | B22F 3/1055 165/166 |
| 2008/0246281 | A1 * | 10/2008 | Agrawal | F01D 15/005 290/52 |
| 2010/0095912 | A1 | 4/2010 | Nomura et al. | |

FOREIGN PATENT DOCUMENTS

| | | | |
|---|---|---|---|
| CN | 101636577 | 1/2010 | |
| EP | 1 079 067 | 2/2001 | |
| EP | 2 131 030 | 12/2009 | |
| JP | 11-93871 | 4/1999 | |
| JP | 2001-59401 | 3/2001 | |
| JP | 2006-518021 | 8/2006 | |
| JP | 2008-231937 | 10/2008 | |
| WO | WO 9961858 A1 * | 12/1999 | ........... F28D 1/0435 |
| WO | 2004/072464 | 8/2004 | |

OTHER PUBLICATIONS

English translation of Chinese Office Action dated Nov. 27, 2014 in CN 201180054806.3, 6 pages.
International Preliminary Report on Patentability dated May 30, 2013 in PCT/GB2011/052200.
International Search Report for PCT/GB2011/052200 dated Jun. 27, 2012.
Written Opinion of the International Searching Authority dated Jun. 27, 2012.
Japanese Office Action dated Aug. 3, 2015 in JP 2013-538274 and English translation, 10 pages.

\* cited by examiner

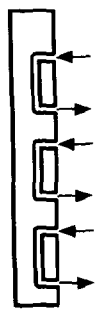
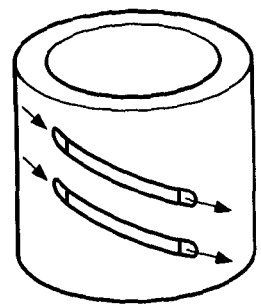
FIG. 4  FIG. 5
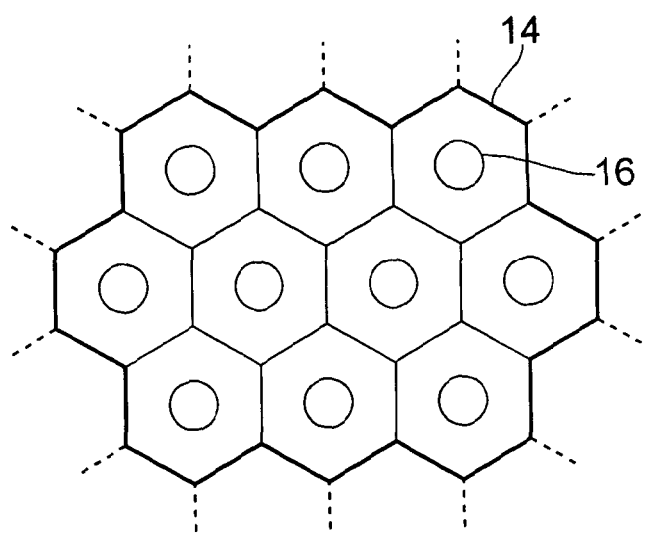
FIG. 6

COMBINED CHAMBER WALL AND HEAT EXCHANGER

This application is the U.S. national phase of International Application No. PCT/GB2011/052200 filed 11 Nov. 2011 which designated the U.S. and claims priority to GB 1019287.0 filed 15 Nov. 2010, the entire contents of each of which are hereby incorporated by reference.

TECHNICAL FIELD

This invention relates to the field of heat exchangers.

BACKGROUND

There is an increasing need for small, high efficiency heat engines for carbon-saving applications in the energy conservation and renewable energy industries. These applications include micro-combined heat and power, concentrated solar power and combined heat and power, heat pumps, power from waste and process heat, and power from small scale solid biomass systems. For many years the Stirling engine has been the favoured prime mover, largely because of the high theoretical efficiency of the Stirling cycle. However, in practice technical issues have prevented achievement of high fractions of that theoretical efficiency, and costs have remained high. As a result the Stirling engine has not been commercialised on a significant scale.

One reason for the lack of commercialisation of Stirling engines is that because the out-of-phase reciprocation of the Stirling engine's pistons creates reversing, unsteady charge gas flows with cyclically varying gas conditions, the heat exchangers that are crucial to the engine's performance can be specified for only one point on the cycle, and are non-optimal for the remainder of the cycle. It also results in anomalous heating and cooling of the charge gas after expansion and compression respectively. Both factors increase loads on the heat exchangers, and increase the need for air pre-heat at the hot end and for heat rejection at the cold end.

A second reason is that there is a severe heat transfer imbalance between the low pressure combustion gases and the high pressure charge gas, and a similar but less severe imbalance at the cooler. In the heater this is exacerbated by the normally cross-flow mode of heat transfer. Increasing the surface area density on the external side of the heater without significant increases in its internal volume, and providing counter-flow/parallel-flow heat exchange, would reduce the imbalance, but it is not possible to do this in a cost effective manner with conventional manufacturing methods.

These two factors contribute to the Stirling engine in general, and its heat exchangers in particular, being larger, more expensive and less efficient than theory alone would suggest.

Other engines and/or cycles have been proposed for these applications, and in some cases they have been used. Examples include rotary Brayton cycle micro-turbines, and organic Rankine cycles with an expander based on scroll compressor technology operating in reverse mode. The rotary and orbiting motions respectively of the components reduce, or in the case of the turbine eliminate, the unsteady flow problem of the Stirling engine. However, their theoretical cycle efficiencies are not as high as that of the Stirling engine, and, as with the Stirling engine, limitations on heat exchanger performance combine, with other factors, to prevent their meeting the requirements of their potential mass markets.

A partial solution to the heat exchanger issue is provided by WO-A-2006/064202 and WO-A-2008/047096, which disclose the design of ducts for heat exchangers manufactured by powder-based, additive layer, near netshape manufacturing techniques based on energy beams, such as laser beams. Such manufacturing techniques are known by various names: one such name is Selective Laser Melting (SLM). SLM can be used to manufacture compact heat exchanger/reactors as described in WO-A-2006/064202. Components made from SLM are normally built up on a thick metal platen, often with SLM-built supports between the component and the platen, and then removed from it by machining or other suitable methods after completion of the build. SLM allows the manufacture of more compact heat exchangers with higher surface/volume ratios, lower hydraulic diameters and almost complete freedom of 3-D design, in combinations which are otherwise not feasible with other manufacturing technologies.

Another potential solution is a Brayton cycle heat engine based on commercial scroll compressor technology. WO-A-2003/069130 discloses such a heat engine whose main mechanical components are a cold scroll compressor and a hot scroll expander, each of which normally comprises a casing, a stationary scroll and an orbiting scroll, with associated valves, ducts, bearings and other components. WO-A-2003/069130 also discloses a heating surface in the form of fins to an outside area of the casing of the scroll, and a heating chamber provided to an outer circumference of the scroll housing. The claimed advantage is that this provides a means of heating the charge gas while it expands in the expander and of cooling it while it is being compressed in the compressor, thus allowing the expansion and compression processes to approach closer to the ideal and most efficient isothermal gas processes possible. The advantage may be interpreted as a change in engine cycle from a Brayton cycle to the potentially more efficient Ericsson cycle. However, it is difficult for such fins to provide a means of increasing heat transfer sufficient to make a significant difference in efficiency.

WO-A-2006/008463 discloses a method of making solid structures and cylindrical components for a reciprocating piston engine in the form of a plurality of tubes spaced apart and held relative to each other by spacers formed by laser melting. The spacers may include fins to enhance heat transfer to fluid within the interstitial volumes between the tubes. The interstitial volumes may be evacuated, filled with fluid, filled with material that will solidify and exploited in a variety of different ways. Different interstitial volumes may be pressurised to different degrees to spread the stresses exerted upon the structure between the various thin-walled tubes. This permits mechanical and thermal loads to be spread through the structure formed of the plurality of tubes spaced apart and held relative to each other by the spacers formed by laser melting.

SUMMARY

Viewed from one aspect the present invention provides an apparatus having a wall configured to serve as at least part of chamber for containing a charge fluid, said wall including a heat exchanger portion integrally formed with said wall, said heat exchanger portion having an array of conduits passing therethrough and providing fluid communication with outside of said heat exchanger portion of said wall, wherein said heat exchanger portion is configured to contribute strength to said wall to provide containment of said charge fluid.

The present technique aims to assist in reducing the size and weight and in increasing the efficiency of heat engines and other machines, such as compressors, heat pumps, turbines and the like. The present technique integrally forms a heat exchanger with a wall which is serving as at least part of a chamber for containing a charge fluid. The heat exchanger has fluid communication via at least some of its array of conduits with outside of the heat exchanger such that heat can be transferred out of the heat exchanger or in to the heat exchanger and accordingly out of or in to the charge fluid. The technique recognises that the heat exchanger which is provided to support such heat transfer may also be used to provide some of the structural strength to the wall and so provide containment of the charge fluid. The heat exchanger is provided to serve its heat exchange function, but an additional benefit realised by the present technique is to integrally form the heat exchanger with the wall containing the charge fluid such that the heat exchanger provides part of the strength to the wall. Thus, the wall may be made thinner (saving weight and material) than would otherwise be the case without the strength added to the wall by the heat exchanger. The heat exchanger may also benefit from its close proximity to the charge fluid with which heat is being exchanged and transferred to outside of the heat exchanger and the charge fluid. In addition, the present technique presents the possibility of incorporating heat exchange into the processes of charge fluid compression and expansion, by which means it becomes possible to modify the machine's cycle efficiency beneficially. One example has already been mentioned, in the improvement in efficiency of an engine based on scroll compressor technology. A second is the use of inter-cooling and/or inter-heating for micro-turbines. Conventionally, inter-cooling and inter-heating is cost-effective only for large scale turbines because of the extra costs, materials, size and weight involved. The present technique presents the possibility of reducing the costs, size and weight of the extra heat exchange components needed to the extent that inter-cooling and inter-heating become cost-effective.

SLM may be used to manufacture the wall and the heat exchanger portion.

This not only brings the advantages of SLM heat exchangers already described, it can also provide more direct heat exchange connections between, for example, a heat source and a working fluid, and helps to reduce the size, weight and costs of manifolds, piping and connections. An example is combining SLM building of a cylinder and ducts located on its outside surface.

In the case of a cylinder, a structure of ducts parallel to the axis of the cylinder may form a lattice structure contained within an inner and outer cylinder wall. The combined thickness of these two walls may be thinner than an alternative original solid cylinder wall because of the strength provided by the lattice structure of the ducts. In an extreme case the duct structure may provide all the strength needed, and no additional cylinder wall is needed. Of course, depending on requirements, a thin lining may be needed to form the inside surface of structure to act as the surface with which, for example, a piston ring may be in contact.

For example, the cylinder, burner, heater and air pre-heater of a Stirling engine might be built as one component using SLM. Other components such as the recuperator may also be integrated in the same SLM build. In other embodiments the integrated components described above may not include the casing: instead, the integrated components may form a cylindrically shaped component that is attached to a thin-walled casing by welding, brazing, heat shrinking, adhesive or other means.

By these means, a wide range of normally solid components of heat engines and other machines may be built with lattice structures, thus using the materials of which they are built in reduced quantities to meet the containment and strength specifications needed. Heat exchanging elements provide at least some of the strength needed, or additional non-heat exchanging elements may be provided to ensure structural strength or other desirable characteristics. For example, what might normally be the solid wall of a pressurised cylinder may be built of an SLM lattice contained within two much thinner SLM walls, thus making the structure lighter and using less material, without undermining the structures ability to meet strength and other specifications. It will be clear that it will be possible in many cases to combine heat exchanging ducts in a lattice structure, so that some components of the structure perform both heat exchange and structural functions, leading to further materials, cost and weight savings. In some cases the structure can be designed so that the forces on the pressurised ducts counter the forces produced on the cylinder wall by the pressure inside the cylinder, thus enabling further materials, weight and cost savings.

The charge fluid may be pressurised. Such a pressurised charge fluid requires strength in the wall of its chamber in order to contain the pressurised charge fluid.

The wall may be one or both of a cylinder wall and a cylinder head, such as is typically used within reciprocating cylinder and piston arrangements.

The present technique may also be used with advantage in a casing of a turbine compressor and/or a casing of a turbine expander.

Further advantageous fields of possible application of the present technique are when the wall is part of one or more of a casing, a static scroll and a moving scroll of one or more of a scroll compressor and scroll expander.

The present technique may also find application when the wall is part of one of a Stirling cycle machine and an Ericsson cycle machine. These embodiments encompass engines when the cycle is used in one direction and heat pumps, coolers and refrigerators when the cycle is used in the opposite direction.

The heat exchanger as mentioned above may be used to cool the charge fluid or to heat the charge fluid depending upon the application. In either case, heat is transferred via fluid communication between the heat exchanger portion and outside of the heat exchanger portion of the wall.

In some embodiments, the array of conduits may be configured to carry a single heat exchange fluid for exchanging heat with the charge fluid. In other embodiments, the array of conduits may be configured to provide heat transfer between fluids carried by different conduits within the array In some embodiments the array of conduits may include a first conduit located within a second conduit for at least a portion of the second conduit. Such conduit-in-conduit heat exchange arrangements may be highly efficient. The conduits need not be concentric.

In some embodiments the first conduit and the second conduit form a pair of concentric conduits with the first conduit passing through a wall of the second conduit.

In some embodiments at least some of the array of conduits have entry and exit ports providing fluid communication with the charge fluid. In this way, heat exchange with the charge fluid may be enhanced by allowing the charge fluid to flow within some of the conduits of the array of conduits.

The array of conduits may be configured such that a transverse cross section through at least part of the array of conduits has the form of a lattice of conduits. This provides a dense and efficient arrangement. Within such a lattice of conduits, there may be included a plurality of inner conduits disposed within respective hexagonal cross section outer conduits. Such an arrangement provides an efficient packing of conduits within the heat exchanger portion.

The heat exchanger portion contributes strength to the wall. In some embodiments it may be that the wall will have insufficient strength to contain the charge fluid during working use without the strength added by the heat exchanger portion. In other embodiments, the wall may be configured to provide enough strength for normal working use without the contribution of the heat exchanger portion, but the heat exchanger portion serves to add an additional margin to the strength of the containment of the charge fluid that is desirable for improved robustness and reliability.

Viewed from another aspect the present invention provides a method of manufacturing at least a component of an apparatus including a wall configured to serve as at least part of chamber for containing a charge fluid, said method comprising the steps of:

providing a plurality of successive layers of a material to be melted;

energy beam melting predetermined regions of each layer in accordance with a predetermined design to fuse said layer with material of preceding layer so as to form a solid structure in which melted portions of each layer fuse with melted portions of a preceding layer; wherein said step of said energy beam melting integrally forms said wall and a heat exchanger portion, said heat exchanger portion having an array of conduits passing therethrough and providing fluid communication with outside of said heat exchanger portion of said wall, said heat exchanger portion contributing strength to said wall to provide containment of said charge fluid.

It will be appreciated that forming the wall and the heat exchanger portion integrally may be conveniently achieved by the use of energy beam melting techniques, such as SLM.

BRIEF DESCRIPTION OF THE FIGURES

Embodiments of the invention will now be described, by way of example only, with reference to the accompanying drawings in which:

FIGS. 3, 4 and 5 schematically illustrate a variety of different arrangements of ducts within a cylinder wall;

FIG. 6 schematically illustrates a lattice of ducts in cross-section;

DESCRIPTION OF EXAMPLE EMBODIMENTS

Figure 1:
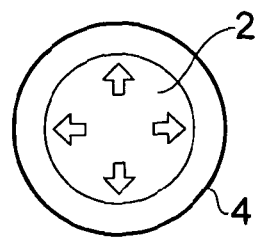
FIG. 1 schematically illustrates a prior art cylinder for containing a charge fluid.

FIG. 1 illustrates a prior art cylinder, such as a cylinder used in a reciprocating piston engine. This cylinder contains a charge gas 2 which must be contained by the cylinder wall 4. The cylinder wall 4 is solid and has a thickness such that it has strength sufficient to contain the charge gas 2.

Figure 2:
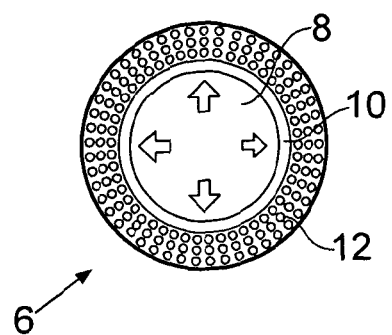
FIG. 2 schematically illustrates a cylinder for containing a charge fluid having an integrally formed heat exchanger within the cylinder wall.

FIG. 2 illustrates a cylinder 6 for a reciprocating piston engine. The cylinder 6 contains a charge gas 8. The wall of the cylinder 6 includes a solid portion 10 and a heat exchanger portion 12. The heat exchanger portion contains a plurality of conduits forming an array of conduits. This array of conduits are in fluid communication with outside of the cylinder 6. Thus, heat may be carried away from the cylinder 6, or to the cylinder 6, via the fluid flowing through these conduits within the heat exchanger portion 12.

It will be seen in FIG. 2 that the solid portion 10 of the wall is thinner than the cylinder wall 4 of the embodiment of FIG. 1. The solid portion 10 of the wall of FIG. 2 may be made thinner as additional strength is provided to the cylinder 6 by the heat exchanger portion 12. Thus, the overall amount of material needed to provide containment of the charge gas 8 and the heat exchange function to and from the charge gas 8 may be reduced by the combined use of the heat exchanger portion 12 to serve both as a heat exchange mechanism and to provide strength to the cylinder 6 in containing the charge gas 8.

Figure 3:
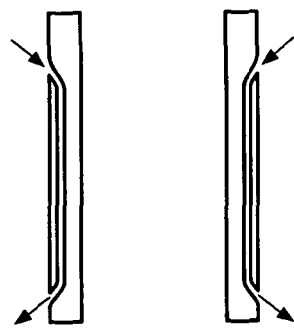

FIG. 3 illustrates one example arrangement of the conduits through the heat exchange portion 12. In this example the conduits run parallel to the central axis of the cylinder 6. The conduits have entry and exit ports for providing fluid communication with other devices, such as other heat exchangers, external of the cylinder 6.

FIG. 4 illustrates another variation. In this embodiment the conduits again run parallel to the axis of the cylinder, but in this case there are multiple conduit sections along the length of the cylinder with each of the conduit sections being in its own fluid communication with outside of the cylinder.

FIG. 5 illustrates another variation. In this variation the conduits follow a path along a portion of a helix lying within the heat exchanger portion 12. The conduits again have entry and exit ports.

FIG. 6 illustrates a transverse cross section through the array of conduits. The array of conduits are arranged in a lattice (regular) arrangement with hexagonal transverse cross section outer conduits 14 each containing a circular inner conduit 16. The inner conduit 16 will typically pass through the wall of the outer conduit 14 at some point along its length (e.g. at a manifold section). The arrangement of FIG. 6 provides a dense, regular and high strength arrangement within the heat exchanger portion 12.

Figure 7:
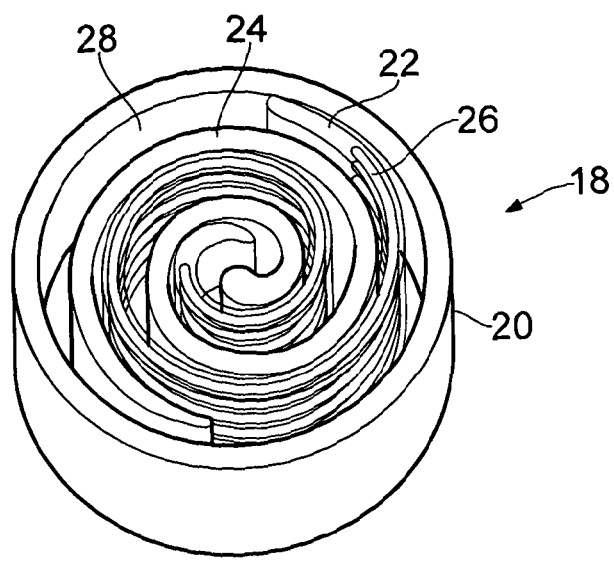
FIG. 7 schematically illustrates a scroll compressor including ducts within one of the static or moving scrolls.

FIG. 7 schematically illustrates a scroll compressor 18. The scroll compressor 18 could equally serve as a scroll expander and the following discussion of a scroll compressor can apply in the same way to a scroll expander.

The scroll compressor 18 includes a casing 20, a static scroll 22 and a moving scroll 24. The static scroll 22 includes an array of conduits 26 forming a heat exchanger portion within the wall that forms the static scroll 22. These conduits 26 lie in a plane perpendicular to the axis of rotation of the scroll compressor 18. At least some of the conduits 26 are in fluid communication with the outside of the scroll compressor 18 such that heat may be transferred into or out of the scroll compressor 18. It may be that some of the conduits 26 are in fluid communication with the charge gas 28 so as to assist heat transfer between the charge gas 28 and fluid being carried through the other of the conduits 26 and passing outside of the scroll compressor 18.

The charge gas 28 is pressurised in the crescent-shaped chambers created between the scrolls as these move relative to each other and accordingly the walls of the static scroll 22 and the moving scroll 24 need to have sufficient strength to contain the charge gas. The crescent-shaped chambers are differentially pressurised relative to each other. The overall charge gas may also be pressurized with the result that the casing of the compressor needs to provide containment. The heat exchanger portion containing the array of conduits 26 within the static scroll 22 contributes strength to the static scroll 22 such that it can serve its function as containing the charge fluid during compression.

Figure 8:
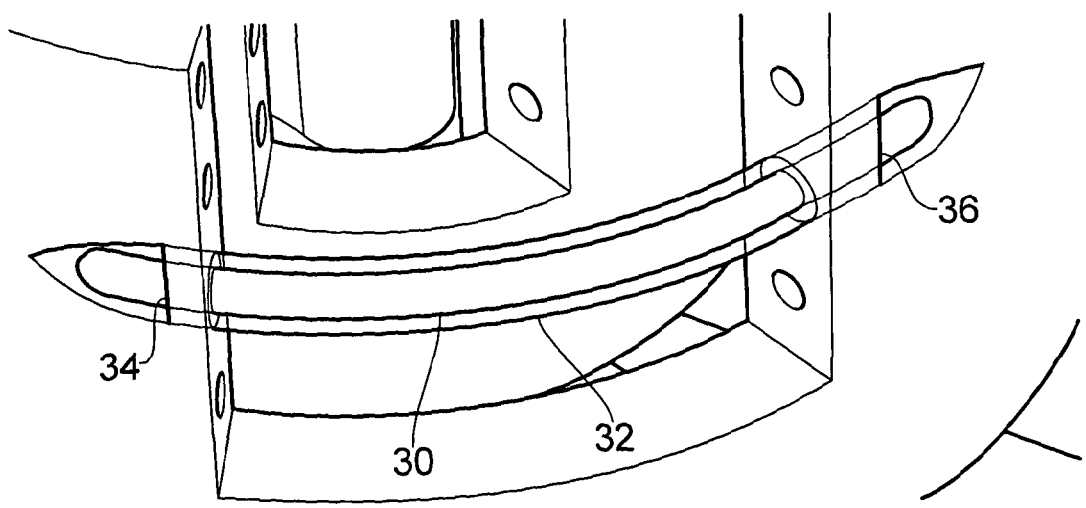
FIGS. 8 to 15 schematically illustrate conduit arrangements within the walls of a scroll compressor.

FIG. 8 schematically illustrates a cutaway portion a scroll wall illustrating a conduit-in-conduit arrangement. An inner conduit 30 carries fluid that is in fluid communication via appropriate manifolds and ducts (not illustrated) with the outside of the scroll. An outer conduit 32 communicates via entry and exit ports 34, 36 with the charge fluid held in the chambers formed between the static scroll 22 and the moving scroll 24 (at the beginning of the compression process and the end of the expansion process the charge fluid is bounded by the casing as well as by the scrolls). The charge fluid is entrained into motion by the relative motion of the scrolls 22, 24 and this drives flow of the charge fluid between the wall of the outer conduit 32 and the wall of the inner conduit 30. This provides enhanced heat transfer between the charge fluid 28 and the fluid within the inner conduit 30.

Figure 9:
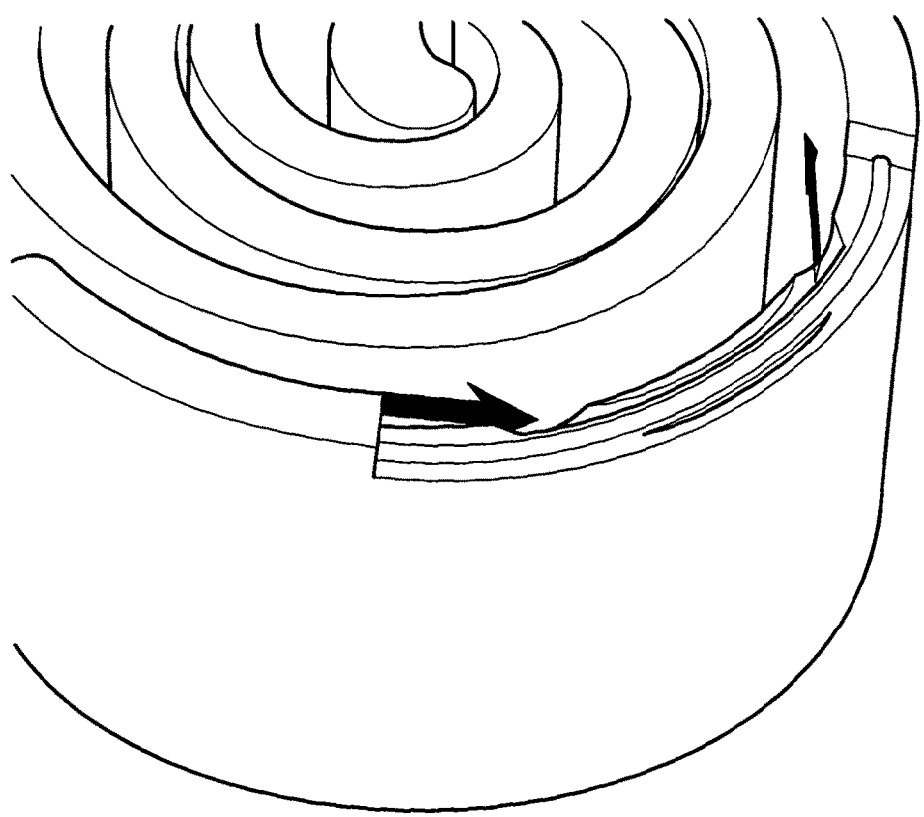

FIG. 9 schematically illustrates the arrangement of FIG. 8 from a different angle. Flow of charge fluid into the outer conduit and out of the outer conduit is illustrated. The inner conduit carries fluid which communicates with outside of the scroll compressor.

Figure 10:
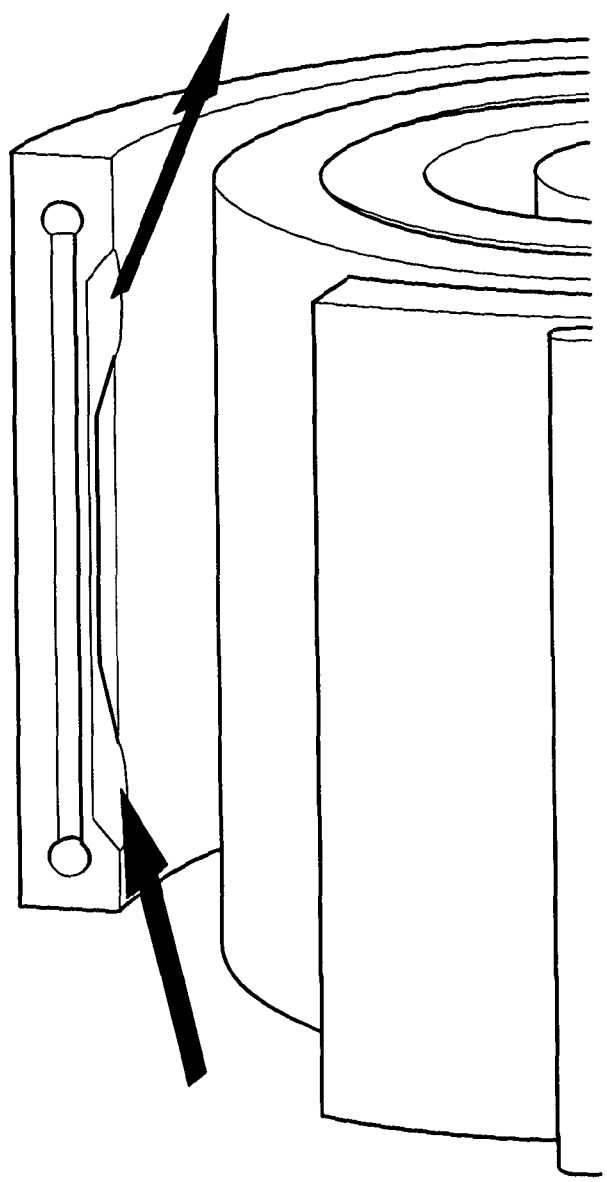

FIG. 10 is an alternative embodiment in which the conduits are disposed in a direction parallel with the axis of rotation of the scroll compressor.

Figure 11:
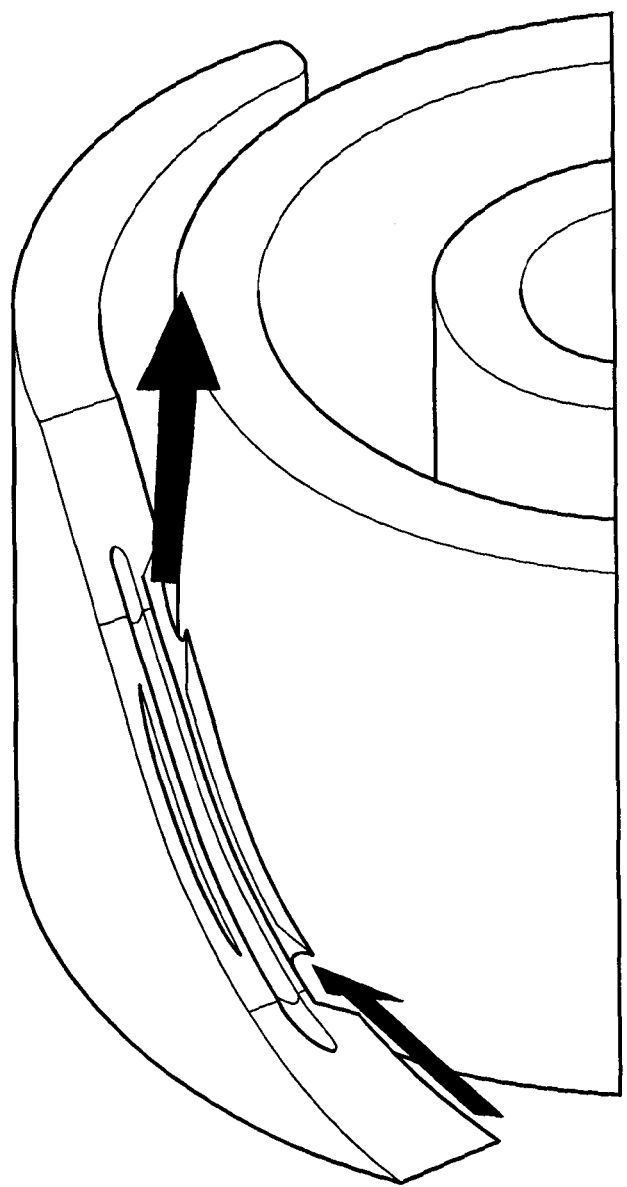

FIG. 11 illustrates an embodiment in which the conduits are disposed at an angle lying between parallel with the axis of rotation and perpendicular to the axis of rotation.

Figure 12:
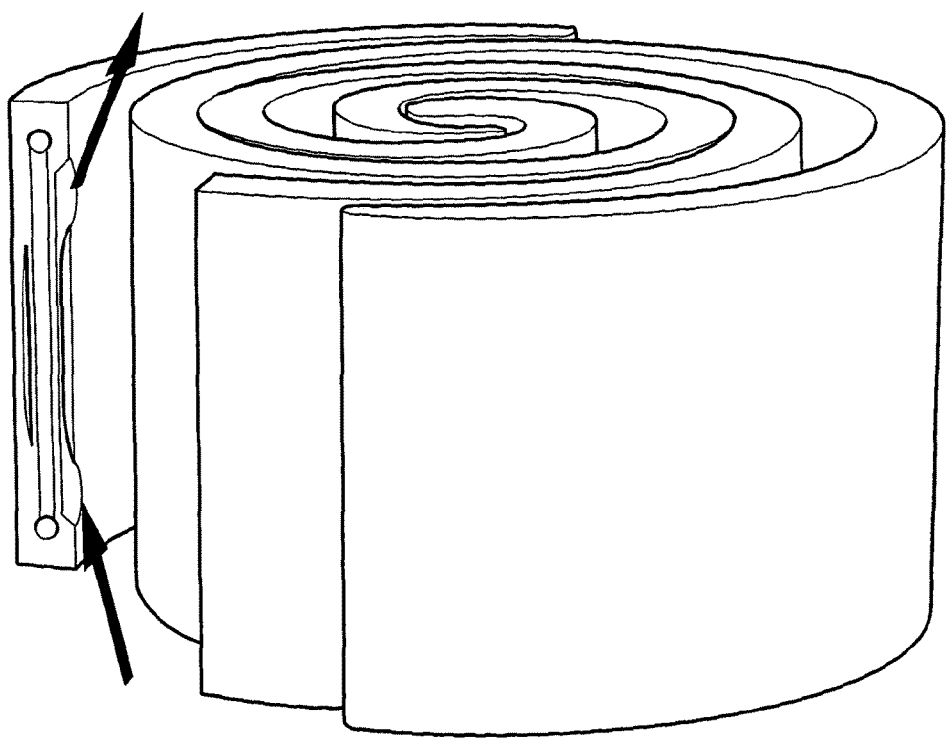

FIG. 12 provides another view of an embodiment in which the conduits lie parallel with the axis of rotation of the scroll compressor.

Figure 13:
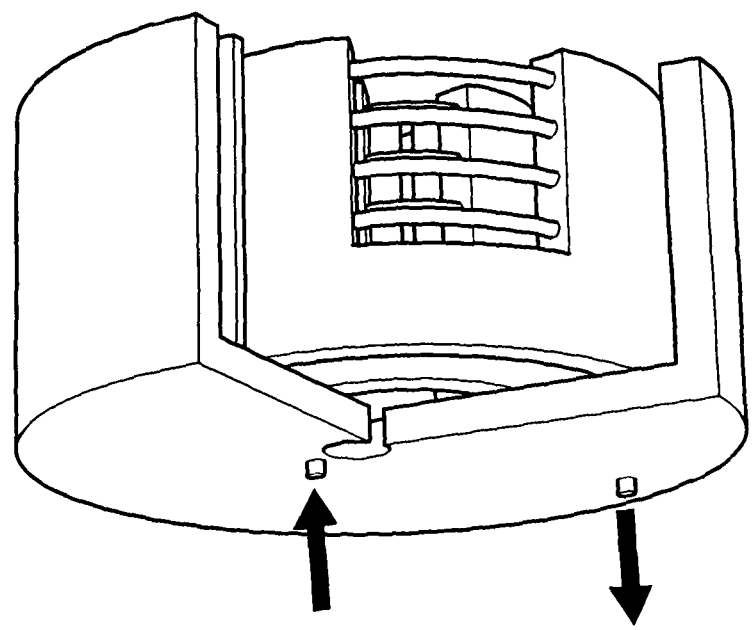

FIG. 13 illustrates an embodiment in which conduits are provided in the casing of the scroll compressor. Entry and exit ports are illustrated through the casing of the scroll compressor. Such entry and exit ports may also provide fluid communication with conduits within the static scroll 22 or the moving scroll 24.

Figure 14:
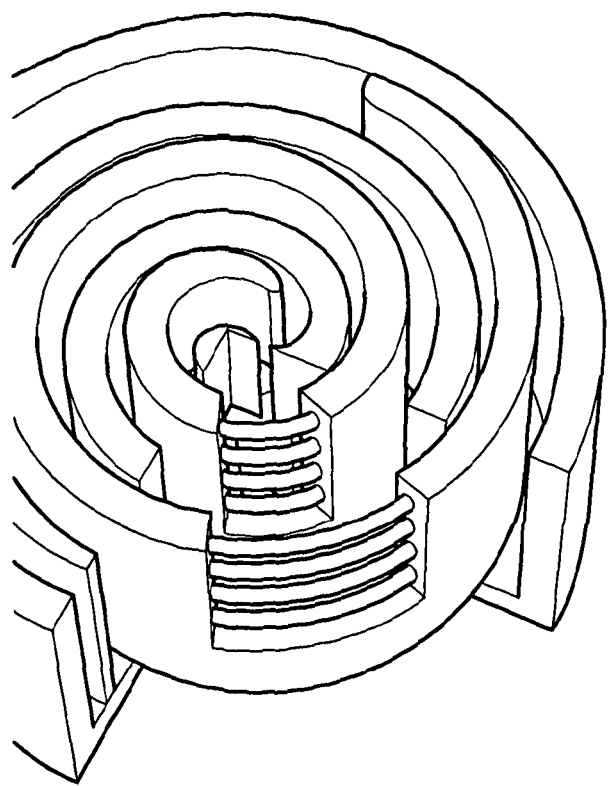

FIG. 14 illustrates a further view of conduits provided within the scrolls 22, 24 and lying in a direction perpendicular to the axis of rotation of the scrolls 22, 24.

Figure 15:
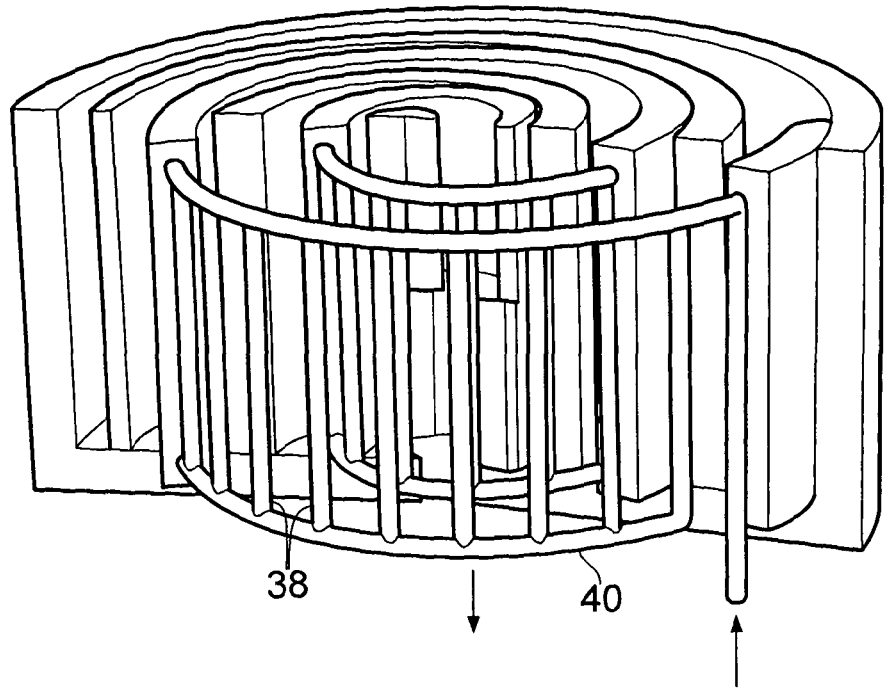

FIG. 15 schematically illustrates an embodiment in which conduits 38 run in a direction parallel with the axis of rotation of the scrolls through the scrolls 22, 24 and are linked by headers 40 to provide fluid flow into and out of the conduits 38 in communication with the mechanisms outside of the scroll compressor, such as further heat exchangers, fluid reservoirs, pumps and the like.

Figure 16:
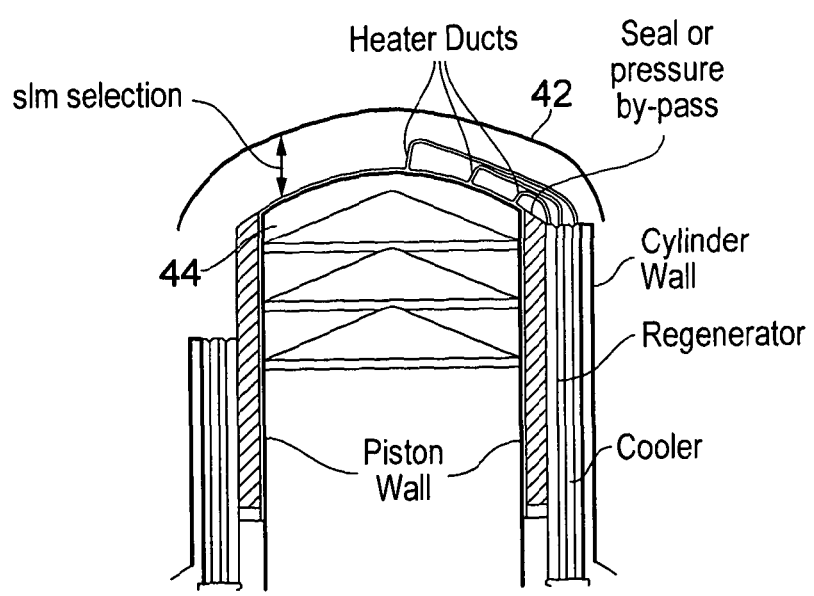
FIGS. 16, 17 and 18 schematically illustrate a Stirling engine incorporating a chamber wall including heat exchanger conduits.

FIG. 16 schematically illustrates a section through a Stirling engine. The cylinder head 42 of the Stirling engine is formed by SLM techniques and includes an array of conduits in accordance with the present techniques. These conduits provide heater ducts for the Stirling engine. The cylinder head 42 also serves the role of containing the charge gas 44.

Figure 17:
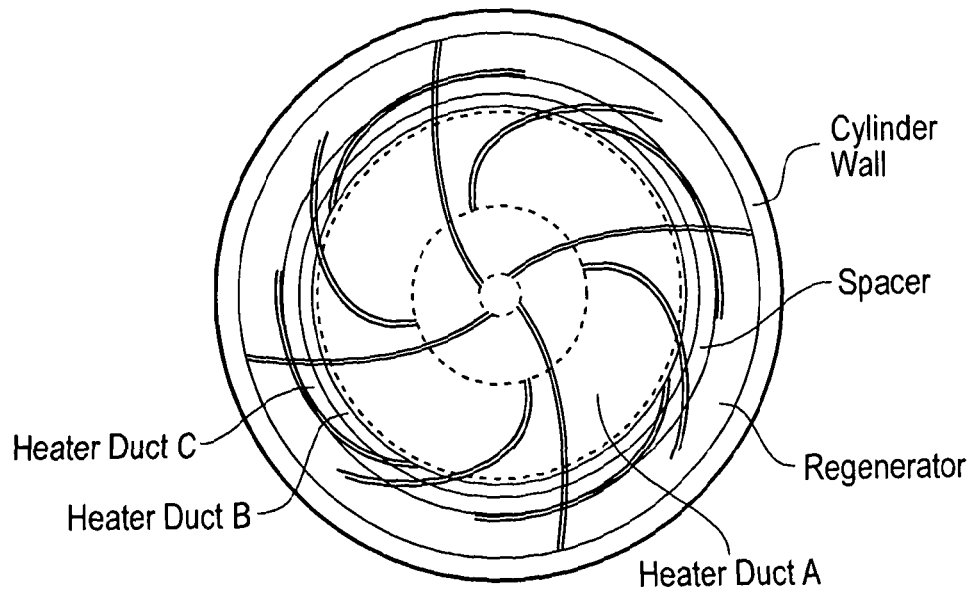

FIG. 17 shows a cross-sectional view through the cylinder head 42 illustrating the array of conduits forming a heat exchanger portion within the cylinder head wall. The inner face of the cylinder head that is in contact with the charge gas 44 will be solid and integrally formed (using SLM techniques) with this solid wall are the array of conduits shown in FIG. 17 (forming the heat exchanger portion of the cylinder head).

Figure 18:
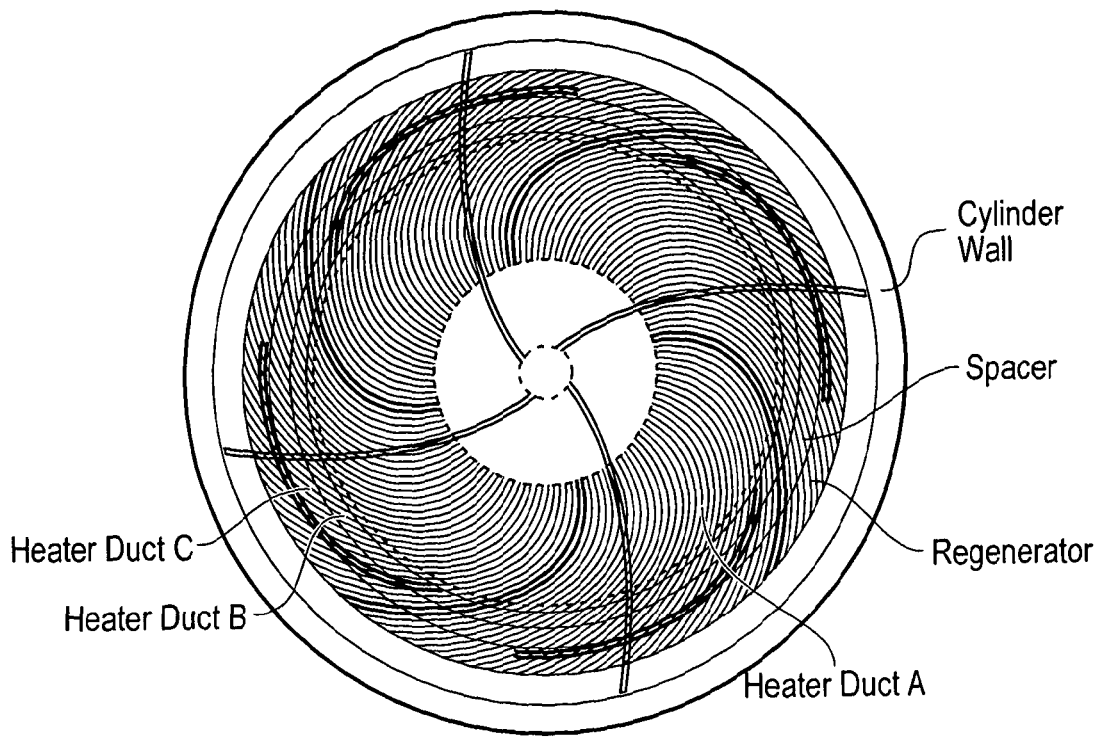

FIGS. 16, 17 and 18 relate to a Stirling engine, but could equally apply to an Ericsson cycle engine.

Figure 19:
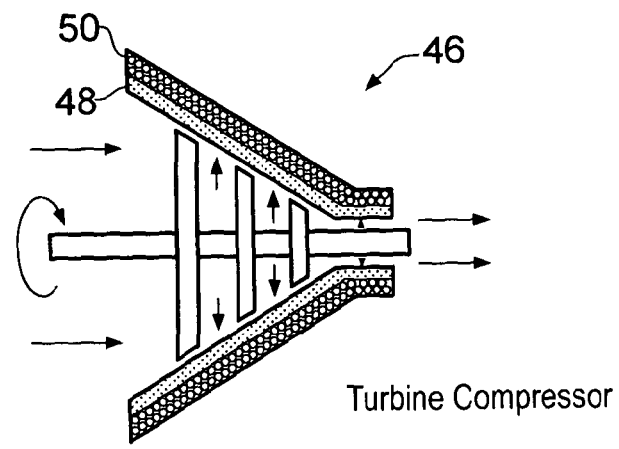
FIG. 19 schematically illustrates a turbine compressor.

FIG. 19 schematically illustrates a turbine compressor 46 having a casing formed of a solid portion 48 and a heat exchanger portion 50. The heat exchanger portion contains an array of conduits carrying fluid that is in fluid communication with apparatuses outside of the casing 46. The heat exchanger portion 50 contributes strength to the casing 46 as well as serving its function as a heat exchanger 40. Accordingly, the solid portion 48 of the casing 46 may be made thinner and thus the weight of the casing 46 and the amount of the material used in the casing 46 may be reduced.

Figure 20:
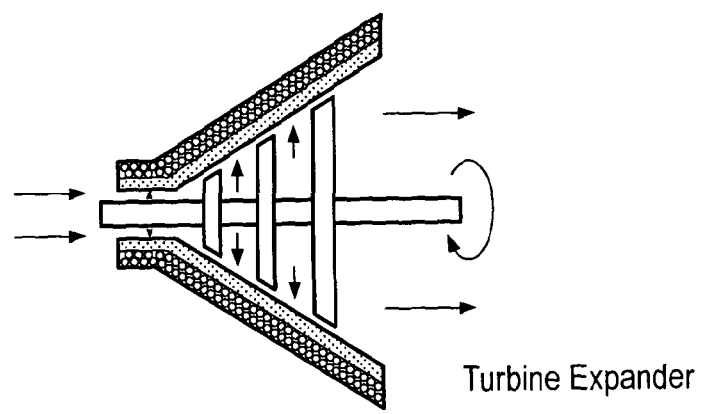
FIG. 20 schematically illustrates a turbine expander.

FIG. 20 is similar to FIG. 19 but in this case illustrates a turbine expander.

Figure 21:
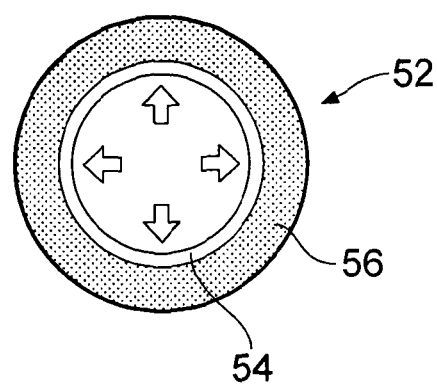
FIG. 21 schematically illustrates a cylinder having a heat exchanger portion formed as material with a controlled porosity providing the conduits therethrough.

FIG. 21 schematically illustrates a cylinder 52 including a solid inner wall 54 surrounded by a heat exchanger portion 56. The heat exchanger portion is formed by an SLM technique in which the parameters of that technique are adjusted so that a desired level of porosity through the heat exchanger portion 56 is achieved. The heat exchanger portion 56 in this embodiment will have a form in which a non-regular collection of gaps between solid regions forms the conduits through the heat exchanger portion 56 and serves as the array of conduits. Those in the field of SLM manufacturing normally consider porosity in a finished product as an undesirable characteristic, but in the present application, such porosity may be exploited to provide fluid communication through a heat exchanger portion and give rise to a heat exchanger function. The heat exchanger portion 56 also contributes to the strength of the cylinder 52 required to contain the charge gas therein.

There are a variety of embodiments, each having common features and also features suited to a particular type of heat engine or other machine. The engine may be based on scroll compressor technology (as illustrated in FIGS. 7 to 15) one or more of whose basic components, typically the casing, the fixed scroll and the orbiting scroll, is built by SLM or similar methods in such a way that the some or all of the walls of a scroll casing and/or some or all of the walls of a scroll itself may contain within them or through them some or all of the ducts of one or more of the engine's heat exchangers, so that some or all of the walls of the scroll casings and/or some or all of the scroll walls themselves become part or all of one or more of the heat exchangers required for the operation of the engine.

For the casing, one example of such ducts is a series of straight parallel ducts that run within the thickness of the cylindrical wall of the casing parallel to the casing's longitudinal axis, with entry and exit points for each duct on the outside face of the casing at or near the ends of the cylinder, where suitable manifolding is provided. Such ducts might run the whole or nearly the whole length of the cylindrical casing.

Alternatively, such ducts might enter the casing at one point on a line parallel to the axis of the cylindrical casing, the point of entry not necessarily being at or close to either end of the casing, and leave at another point on the same line, with the manifolding being tailored to such arrangements.

It will be clear that other arrangements are possible. For example, ducts within the thickness of the casing may not be parallel to the axis of the cylindrical casing wall. Such ducts may be straight when viewed in the plane that contains the duct and the line through the duct's centre point that meets the cylinder's longitudinal axis at right angles. Alternatively, ducts may be curved in all planes. An extreme case arises when each of a series of parallel ducts lies in a plane that is perpendicular to the axis of the cylinder wall, and parallel to the ends of the cylinder. Ducts may be interconnected; they may also take the form of U-shapes or variations on them.

Similar arrangements will be possible for the walls of the scrolls. A preferred arrangement has a number of ducts vertically stacked within the scroll wall, the plane of each duct being perpendicular to the axis of the scroll, each duct following nearly the complete length of the form of the scroll wall, each connecting to common exit and entry ports at or close to the centre and periphery as required. In practice, such horizontal ducts may not be continuous but may be divided into segmented groups to improve heat transfer and fluid flow through each group, each group being linked to entry and exit headers, which may take the form of a single duct, typically larger in diameter than the segmented ducts.

An alternative arrangement has vertical ducts, with the headers horizontal. Again, in practice, to improve heat exchange and fluid flow, the vertical ducts may be divided into groups, each with its horizontal entry and exit headers.

It should be noted that because the motion of the moving scroll is orbital rather than rotary, it is possible to pass fluid into manifolds and from them to the ducts in the moving scroll's walls, by means of flexible pressure hose, without the joint complexity that would be needed is the motion were fully rotary.

It will be noted that the increases in heat transfer surface area provided by these methods are all on one side of the heat exchanger. In this embodiment it is the side occupied by the coolant and/or heat source. In many eases it will be advantageous to increase the heat transfer surface area on the other side of the heat exchanger, instead of or as well as increasing the heat transfer area on the side already described. In the present embodiment, this is the charge fluid side—bounded by the internal surface of the scroll casing and the surfaces of the fixed and moving scrolls walls. Such increases may be achieved by means of charge fluid ducts within the thickness of the walls of the scroll casing and/or the walls of either or both scrolls.

Typically, these ducts will have entry and exit ports on the same wall surface.

Typically, the cross-sections of the ducts and the shapes of their ports will be designed so that as the fluid that is being compressed or expanded passes along the wall surfaces, small portions of the fluid are forced into, through and out of each duct by a combination of momentum, changes in pressure, and the aerodynamic shapes of the duct and their entry and exit ports.

Preferably, these ducts will engage for at least part of their length with suitable proportions of the ducts through which pass the coolant or heat source in the case of the compressor or expander respectively, so that more effective heat exchange can take place between the charge fluid and the coolant or heat source. Preferably they will be engaged so that one duct—normally a coolant or heat source duct—will contain the charge fluid duct within it to allow counterflow heat exchange between the fluids in the two ducts.

Typically, the entry and exit ports of each of these ducts will be arranged so that, viewed in plan with the axis of the cylinder and scrolls being vertical, the distance between them is short relative to the lengths of the surface of the two walls of the crescent-shaped compression or expansion chamber at that point in the cycle. This ensures that a large a number of small portions of the fluid pass through each duct to increase heat exchange before the relative movement of the chamber walls causes one port to shift its relative position to a neighbouring chamber formed by the same casing or scroll wall surfaces that will typically be at a higher or lower pressure than the original chamber. At that point fluid from the chamber at the higher pressure may pass into the chamber at the lower pressure. In general, the ducts will be arranged so as to reduce the extent to which this happens.

However, in some cases, for reasons of temperature control or for other reasons, it may be desirable to have a controlled flow of fluid between neighbouring chambers with the same casing and/or scroll wall surfaces, in which case some or all of the ducts may be longer, so that a duct spans two chambers for a longer period of time, and more of the fluid is transferred between chambers across the moving point of contact or minimal distance between two chambers. Alternatively, it may be beneficial for fluid to flow from one chamber to a neighbouring chamber which is on the other side of one of the walls whose surfaces form that chamber. In this case one port of a duct may be on the other side of the wall from the other duct, so that fluid enters the duct on one side of the wall from a chamber on that side of the wall and exists into a neighbouring chamber on the other side of the wall.

A further embodiment (as illustrated in FIGS. 16, 17 and 18) is the heater of a Stirling engine, by which the heat from the heat source, usually but not always from the combustion of a solid, liquid or gaseous fuel, is transferred to the charge gas sealed inside the engine. There are two main methods. The first is direct heating of the hot cylinder. Typically, the combustion gases will pass over and between fins onto the outside surface of the cylinder. Heat from the combustion gases is then transferred to the fins, through the metal of the cylinder wall, to fins fitted to the internal wall of the cylinder, and thus to the charge gas passing through and between the internal fins. A variation on this method is to use a high radiation burner, in which case fins on the outside of the cylinder may not be necessary The second method uses a separate, normally tubular heat exchanger. A common form consists of closely spaced tubes, each tube being bent into a tight U-shape, arranged in an array. Typically, an array will take the form of vertical U-tubes arranged in a circle, so that the inner lengths of the U-tubes form an inner circle, and the outer lengths of the U-tubes form an outer circle. One end of each tube may be directly connected to the hot cylinder of the engine and the other end to the regenerator, or manifolds may be used. In a circular array, the combustion gases typically pass, in a cross-flow heat transfer mode from the inside of the array, radially outwards between the inner lengths of the U-shaped tubes, and then continuing radially outwards between the second, outer lengths of the U-shaped tubes. The second, outer lengths are often finned, to maximise the heat transfer to the tubes from the combustion gas that has already lost some of its heat to the inner lengths.

Neither of these methods provides a satisfactory solution to the problems posed by the mismatch in the gas conditions between the combustion gases and the charge gas. Typically, the pressure of the charge gas is 1-3 orders of magnitude greater than the pressure and specific heat of the combustion gases. This means that the heat transfer surface area of the combustion side of the heater should, ideally, be a similar order of magnitude greater than the heat transfer surface area of the charge gas side in order to balance the heater and maximise performance and minimise its size, costs and pressure drops. In practice, this is impossible to achieve, at least at acceptable costs, and the two methods described above provide necessary but unsatisfactory compromises.

The present techniques provide a compact heat exchanger, incorporating, for example, a combustor, air pre-heater and heater that can be integrated with a component of the engine itself, for example a cylinder. The heater consists of a large number of charge gas tubes with low hydraulic radii connecting the annular regenerator with the top of the displacer cylinder. In elevation, from the top of a vertically orientated cylinder, the tubes start, typically vertically, from where in the conventional engine the heater head would be located. They curve over, until they proceed approximately horizontally and radially outwards from axis of the cylinder, and then turn back down vertically towards the annular regenerator. The tubes are in layers. In elevation, the lowest layer passes from the outside of the top of the cylinder to the inside of the annular regenerator. The highest layer is the layer that starts closest to the axis of the cylinder and passes to the outermost part of the annular regenerator. Typically, in plan each layer starts from a circle whose centre is the longitudinal axis of the cylinder. The circle for the top layer has the smallest diameter, while the circle for the bottom layer has the largest diameter and is closest to the cylinder's outer perimeter. There are gaps between adjacent tubes in each layer, and between adjacent layers, through which combustion gases from a combustor situated above the heater itself can pass.

It will be clear from the proceeding description that some means should be introduced to ensure that the gaps between adjacent tubes in the same layers provide controllable and consistent passage of the hot combustion gases and controllable and consistent heat transfer to the tube walls. Also, to ensure consistent mass flow rates of the charge gas through each tube it may be desirable that each tube should have the same or approximately the same length. These two requirements may be met in two ways. First, the main horizontal or nearly horizontal section of each tube may, in plan, take the form of an involute, which ensures that the gaps between adjacent tubes in any one layer can be the same. Second, the form of the involute and the angle at which it commences may be adjusted between layers so as to ensure that each tube has the same overall length. For example, the tubes in the uppermost layer, that start from a circle closest to the centre of the top of the cylinder, may take an almost radial path relative to the circle from which they start to the point at which they turn down towards the regenerator. In contrast, the tubes in the lowest layer, which start at the outermost perimeter of the cylinder, may take an almost tangential path relative to the circle from which they start. By these means the tubes can be approximately or exactly the same length.

Fins may be incorporated onto the heater tubes; if required, they can also function as struts that attach adjacent tubes to each other. The fins, together with appropriate baffles, may also be oriented in such a way as to form ducts for the combustion gases that surround the near horizontal sections or other sections of the heater tubes. In this manner, counter-flow heat exchanger may take place while the charge gas is flowing in one direction, and parallel flow when it flows in the other direction. Preferably it will be arranged so that the counter-flow heat exchange takes place during the expansion part of the cycle, when the charge gas is passing from the regenerator into the displacer or hot cylinder.

Variations on this basic geometry are possible. It will be clear that the involutes may arranged so that the gap between adjacent tubes varies along its longest and nearly horizontal section length, for example increasing or decreasing from the cylinder end to the regenerator end. Alternatively, the gap may be constant along the relevant length of the two tubes.

It will also be clear that the number of tubes in each layer will vary according to the hydraulic diameter, wall thickness and pitch. Of course, it may be preferable in some cases for hydraulic diameter, wall thickness and pitch to remain the same between layers. However, in other cases it may be preferable for, for example, the pitch in the upper layers to be greater than in the lower layers to allows radiative heat transfer to penetrate deeper into the layers.

Made to this design, it is clear that the heater can takes the form of a single honeycombed structure. The structure may be attached to the top of the cylinder wall by, for example, electron beam welding. Alternatively, the structure may be built by energy beam methods straight onto the top of the cylinder wall, using the latter as the base of the build.

Unlike a conventional tubular heater in which the area of the cylinder heat that is taken up by the manifold or individual tube ports is relatively small, the whole area of the top of the cylinder may be taken up by tube ports. By this means the conventional cylinder head may be partially or completely eliminated, with consequential cost savings.

The invention claimed is:

1. A method of manufacturing a turbine comprising a compressor or an expander, the compressor or the expander including a casing and a rotor disposed to rotate within the casing, said method comprising the steps of:
   providing a plurality of successive layers of a material to be melted;
   energy beam melting predetermined regions of each layer in accordance with a predetermined design to fuse said layer with material of preceding layer so as to form a solid structure in which melted portions of each layer fuse with melted portions of a preceding layer; wherein
   said step of said energy beam melting integrally forms a wall of said casing and a heat exchanger portion, said heat exchanger portion having an array of conduits passing therethrough and providing fluid communication with outside of said heat exchanger portion of said wall,
   wherein a cross-sectional area of the casing at an inlet of the compressor or the expander is different than a cross-sectional area of the casing at an outlet of the compressor or the expander, and wherein the heat exchanger portion extends around the rotor together with the casing.

2. A method as claimed in claim 1, wherein said material to be melted is a powder and said step of energy beam melting provides said array of conduits by controlling a level of porosity thought said powder when melted.

* * * * *